J. CALDWELL.
MOWER KNIFE SHARPENER.
APPLICATION FILED AUG. 3, 1917.
1,313,790.
Patented Aug. 19, 1919.
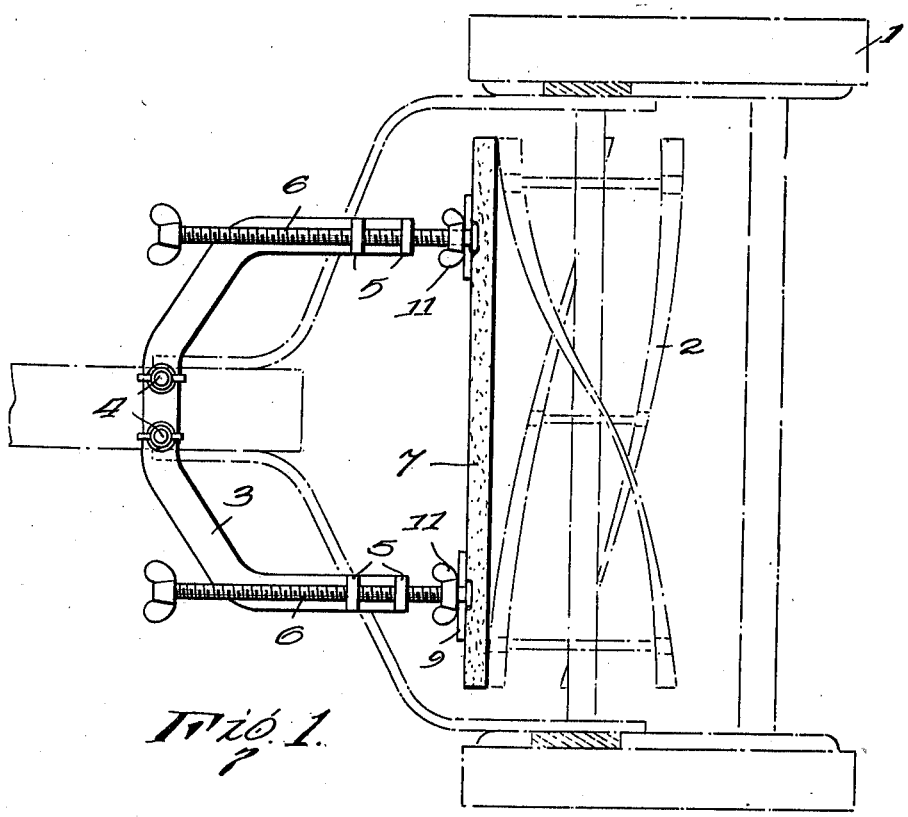
Fig. 1.
Fig. 2.
Fig. 3.
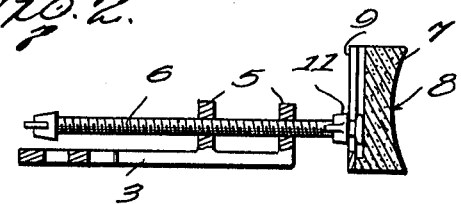
John Caldwell
Inventor
By Geo. P. Kimmel
Attorney

UNITED STATES PATENT OFFICE.

JOHN CALDWELL, OF CORRY, PENNSYLVANIA.

MOWER-KNIFE SHARPENER.

1,313,790. Specification of Letters Patent. Patented Aug. 19, 1919.

Application filed August 3, 1917. Serial No. 184,290.

*To all whom it may concern:*

Be it known that I, JOHN CALDWELL, a citizen of the United States, and resident of Corry, in the county of Erie and State of Pennsylvania, have invented certain new and useful Improvements in Mower-Knife Sharpeners, of which the following is a specification.

This invention relates to improvements in sharpening devices and it is the principal object of the invention to provide a novel device for sharpening the knives of a lawn mower and which, can be easily attached to the same without alteration thereto.

Among other aims and objects of the invention may be recited, the provision of a device of the character mentioned with a view to compactness, and in which the number of parts are few, the construction simple, the cost of production small, and efficiency and operation high.

The foregoing together with additional advantageous details and arrangements of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings:—

Figure 1 is a bottom plan of a lawn mower with the improved sharpening device applied thereto, the side roller of the mower being removed;

Fig. 2 is a vertical section through the improved sharpening device; and

Fig. 3 is a fragmentary detail in perspective of the sharpening block.

Similar characters of reference refer to similar parts throughout the several views of the drawings.

Having more particular reference to the drawings, 1 represents the lawn mower in its entirety, having the usual reel rotatably mounted thereon and carrying curved knives 2.

The improved sharpening device comprises a substantially U-shaped bracket having a plurality of screw threaded openings formed in the base thereof, the said bracket being designated by the numeral 3. Through the screw threaded openings formed in the said bracket, screw bolts 4 are passed into engagement with the handle of the lawn mower which has been previously turned bottom side up. Vertically disposed arms 5 are formed upon the opposite extremities of the brackets 3 and are provided with horizontally alined screw threaded openings through which bolts 6 are passed, the heads of the same being engaged with the sharpening or abrasive block.

A sharpening block 7 is provided and has one face thereof concaved as at 8 whereby the same may be properly engaged by the cutting edges of the mower 9 upon rotation of the same. Slotted metal pieces 9 are secured to the opposite side of the block 7 and have slots formed therein arranged adjacent grooves 10 formed in the said block. Into the slots of the pieces or plates 9 and the adjacent grooves 10, the heads of the bolts 6 are passed and are locked in position therein through the medium of wing nuts 11.

It is to be noted, that the sharpening block 7 when properly adjusted is arranged substantially parallel to the shaft carrying the knife reel of the mower and is so spaced with relation to the same as to permit the intermittent engaging of the various cutting edges of the mower knives 2 therewith upon rotation of the same.

In operation, when it is desired to sharpen the knives of the lawn mower, the same is turned bottom side up and the sharpening block 7 properly adjusted with relation thereto. The lawn mower is now moved over a surface, causing rotation of the knife carrying reel and as a consequence, the intermittent engagement of the cutting edges of the said knives with the concaved face 8 of the sharpening block 7. In this way, the same will be properly sharpened.

Manifestly, the construction shown is capable of considerable modification and such modification as is within the scope of my claim, I consider within the spirit of my invention.

I claim:—

A blade sharpener for lawn mowers including an abrasive element having transverse recesses formed in one side thereof in spaced relation and opening onto one edge of said element, slotted metal pieces secured to the abrasive element and arranged over the recesses therein, the slots in said pieces being of less widths than the widths of said recesses, headed screw threaded rods engaged in the recesses and slots in said metal pieces, means for locking the screw threaded rods in adjusted positions with respect to said abrasive element, and attaching means secured to a portion of the lawn mower and receiving said screw threaded rods therethrough whereby to permit adjustment of the same to vary the positioning of the abrasive element with relation to the lawn mower blade to permit sequential engagement of the same therewith.

In testimony whereof I affix my signature hereto.

JOHN CALDWELL.

Copies of this patent may be obtained for five cents each, by addressing the "Commissioner of Patents, Washington, D. C."